A. A. FAUST.
GAGE.
APPLICATION FILED MAR. 25, 1913.
1,155,715.
Patented Oct. 5, 1915.
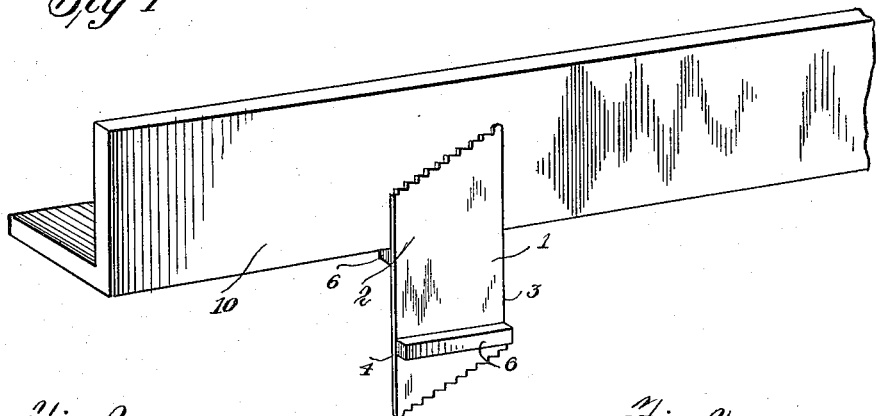
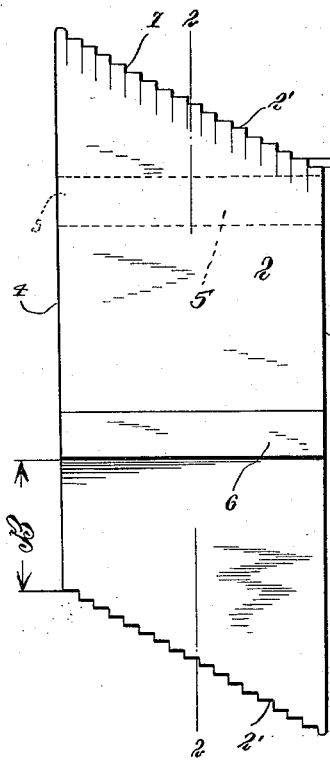
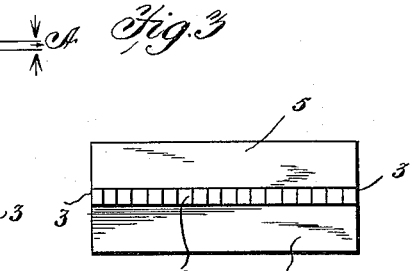
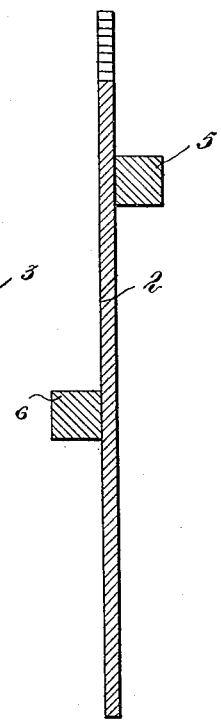
WITNESSES
INVENTOR
Albert A. Faust
his Attorney

UNITED STATES PATENT OFFICE.

ALBERT A. FAUST, OF DETROIT, MICHIGAN.

GAGE.

1,155,715.  Specification of Letters Patent.  Patented Oct. 5, 1915.

Application filed March 25, 1913. Serial No. 756,794.

*To all whom it may concern:*

Be it known that I, ALBERT A. FAUST, a citizen of the United States, residing at Detroit, in the county of Wayne and State of Michigan, have invented certain new and useful Improvements in Gages, of which the following is a specification.

This invention relates to improvements in gages or measuring instruments and more particularly to a gage used by structural iron workers, carpenters or like mechanics, in laying out different pieces of material used in connection with their profession.

The primary object of this invention is the provision of a gage with which a large number of different measurements are made possible without the necessity of adjusting a number of parts to obtain the measurements and also to provide a gage of this nature which is extremely simple in construction, light and easily carried about from place to place.

Another object of this invention is to provide a gage which will greatly facilitate the laying out of various pieces of lumber, structural iron or the like and which is so constructed that the same may be used as a square or straight-edge.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawings wherein like characters of reference designate like or corresponding parts throughout the several views, and in which, Figure 1 is a perspective view of the improved gage showing the same being used in connection with a piece of angle iron; Fig. 2 is an enlarged face view of the gage; Fig. 3 is a top plan view of the same; and, Fig. 4 is a sectional view on the line 2—2 of Fig. 2.

In the laying out of various pieces of material used in all types of structural work, it is, in many instances, necessary to mark and cut a piece of material a definite width as well as a definite length and to facilitate this work the gage 1 is provided which has none of the cumbersome and unhandy as well as unwieldy features usually found in gages employed in this type of work, The gage 1 is constructed principally of a flat piece of material 2 preferably of thin tempered steel so as to reduce the weight of the same as well as to add to the length of usefulness and the absolute accuracy of the same, but any suitable type of material may be employed. The ends of the piece of material 2 which form the main body portion of the gage are provided with serially arranged cut-out portions or steps 2', the end edges of the steps being parallel one with the other while the side edges are also parallel one with the other and with the edges 3 and 4 of the plate 2. The height or the distance between the two lines as indicated by A is in each instance the same: for example, when the distance A is made to be three-sixteenths of an inch each of the other side edges is three-sixteenths of an inch in length, the greatest accuracy being employed in the making of the device.

In some instances it may be desirable to gage one end of the plate 2 with one degree or size of measurements and the other end with a different set of measurements so that the gage may be used for different purposes or meet with its many requirements. Two cross bars 5 and 6 are mounted upon opposite surfaces of the plate 2 and at right angles to the edges 3 and 4, this causing them to extend parallel with the end edges of the steps 2'. The cross bars 5 and 6 are mounted upon the opposite surfaces of the plate 2 at a definite distance from the end edges of the steps 2' as is indicated by B, this distance being any one which will be most useful in the line of work to which the gage is to be applied.

The cross bars used in connection with the longitudinal edges 3 and 4 of the plate 2 will form a square or a means for the marking of lines upon any piece of material when laying out the same. The plate 2 being of a definite width will aid in measuring distances upon the material such as the angle iron 10 which is shown in Fig. 1 of the drawing.

The various steps upon the plate 2 may be graduated as is shown at 7 but it is not necessary to do so, this feature being at the option of the manufacturer or the user of the gage.

When using the improved gage which has been heretofore described and which is shown in the drawing, either of the cross bars 5 or 6 is placed so as to engage one of the longitudinal edges of the piece of material upon which the workman is working and should it be desired to decrease the width of the piece of material a scriber of any convenient type of marker is placed in the corner of the step which designates the desired width of the piece of material and while the gage is slid along the longitudinal edge of the piece of material the scriber is rigidly held in place thus making a mark upon the material to aid the workman in cutting the same. Should it be desired to lay off definite or different distances relative to the length of the piece of material the gage may be employed as a square or straight-edge using either of the edges 3 or 4 in the same manner as the edge of a square is used.

It will be seen from the foregoing description and the drawings that any desired number of measurements may be made upon a gage of this type and also when the plate is graduated any desired measurement may be quickly and conveniently found without the necessity of adjusting a number of parts.

In practical fields, certain minor features of construction, combination and arrangement of parts may necessitate alterations to which the patentee is entitled, provided such alterations are comprehended within the scope of what is claimed.

What is claimed is:—

1. In a gage, a flat piece of material forming a body portion, steps formed upon opposite ends of said body portion, and cross bars mounted upon said body portion and extending at right angles to the sides thereof.

2. In a gage, a flat piece of material forming a body portion, steps formed upon opposite ends of said body portion, and cross bars mounted upon the upper and lower faces of said body portion and extending at right angles to the sides thereof.

3. In a gage, a flat piece of material forming a body portion, each end of said body portion provided with a series of cut-away portions, said cut-away portions forming steps, and cross bars mounted upon said body portion and extending at right angles to the longitudinal edges thereof and parallel with one edge of said steps.

4. In a gage, a flat piece of material forming a body portion, each end of said body portion being provided with a series of cut-away portions, said cut-away portions forming steps, and cross bars mounted upon the upper and lower faces of said body portion and extending at right angles to the longitudinal edges thereof and parallel to one edge of said steps.

In testimony whereof I affix my signature in presence of two witnesses.

ALBERT A. FAUST.

Witnesses:
E. E. SILVEY,
HORMER B. HANCOCK.

Copies of this patent may be obtained for five cents each, by addressing the "Commissioner of Patents, Washington, D. C."